(12) United States Patent
Chen et al.

(10) Patent No.: US 7,474,232 B2
(45) Date of Patent: Jan. 6, 2009

(54) PARKING LOT RESERVATION SYSTEM WITH ELECTRONIC IDENTIFICATION

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 228 days.

(21) Appl. No.: 11/453,811

(22) Filed: Jun. 16, 2006

(65) Prior Publication Data

US 2007/0129974 A1 Jun. 7, 2007

(30) Foreign Application Priority Data

Dec. 6, 2005 (TW) ............................... 94142878 A

(51) Int. Cl.
*G08G 1/14* (2006.01)
(52) U.S. Cl. ...................... 340/932.2; 705/13
(58) Field of Classification Search ................ 340/905, 340/932.2; 705/5, 13
See application file for complete search history.

(56) References Cited

U.S. PATENT DOCUMENTS

| | | | | |
|---|---|---|---|---|
| 5,748,107 A * | 5/1998 | Kersken et al. | ............. | 340/905 |
| 6,340,935 B1 * | 1/2002 | Hall | ........................ | 340/932.2 |
| 7,260,472 B2 * | 8/2007 | Sutardja | ..................... | 701/117 |
| 7,312,722 B2 * | 12/2007 | Tillotson et al. | ......... | 340/932.2 |
| 2003/0112154 A1 * | 6/2003 | Yoakum et al. | ........... | 340/932.2 |
| 2004/0068433 A1 * | 4/2004 | Chatterjee et al. | ............. | 705/13 |
| 2004/0254840 A1 * | 12/2004 | Slemmer et al. | .............. | 705/22 |

* cited by examiner

*Primary Examiner*—Brent Swarthout
(74) *Attorney, Agent, or Firm*—Bacon & Thomas, PLLC

(57) ABSTRACT

A parking lot reservation system in which each vehicle sends to a remote server through a GPRS module a park reservation request carrying the information of the ID code and current location of the vehicle and specific conditions, and the remote server searches a parking lot database to select the qualified parking lot information subject to the park reservation request and then sends a reservation command to the parking lot computer of the associated parking lot through the Internet to finish the reservation. After success of reservation, the parking lot computer sends a response message indicative of successful reservation to the GPRS module of the vehicle via the remote server.

22 Claims, 2 Drawing Sheets

PARKING LOT RESERVATION SYSTEM WITH ELECTRONIC IDENTIFICATION

BACKGROUND OF THE INVENTION

1. Field of the Invention

The present invention relates to a reservation system with electronic identification and more particularly, to a parking lot reservation system with electronic identification.

2. Description of Related Art

At the present time, many families have at least one vehicle for transportation. However, because every parking lot provides limited parking spaces, some parking lots may have zero capacity at a different time period while the used rate of other parking lots is low.

For example, the parking lot of an office building may be fully occupied during the work hours, and visitors may be unable find a place to park a vehicle. At the same time, the parking lot of a nearby department store or distribution center may have a high vacancy capacity due to there being few visitors.

In order to eliminate the aforesaid problem, every parking lot may provide different fee rates for different time periods so as to improve the frequency of use. However, most parking lots control the access by labor and are unable to provide parking lot information to the driver in good time.

SUMMARY OF THE INVENTION

The parking lot reservation system with electronic identification of the present invention comprises a plurality of vehicles, a plurality of parking lots, a remote server, and a plurality of parking lot computers. Each vehicle carries an electronic identification device, which provides a respective identification code. Each vehicle further comprises a global positioning device and a wireless communication device is electrically connected to the global positioning device. The global positioning device is adapted to calculate the current location of the associated vehicle.

The remote server has electrically connected thereto a wireless communication module and a parking lot database. The parking lot database has stored therein the parking lot information of each parking lot. Each parking lot has at least one access. Each parking lot also provides the respective parking lot information, which comprises the geo data and vacancy capacity of the associated parking lot.

The parking lot computers are respectively installed in the parking lots, and connectable to the remote server through the Internet. Each parking lot computer has electrically connected thereto at least one electronic identification reader being respectively installed in the at least one access of the associated parking lot.

The wireless communication device of each vehicle is adapted to send out a park reservation request wirelessly. The park reservation request contains the information of the current location of the associated vehicle.

The remote server receives the park reservation request from each vehicle through the wireless communication module, and then searches the parking lot database subject to the information of the current location of the respective vehicle contained in the received park reservation request so as to select the parking lot information of one of the parking lots subject to at least one predetermined condition that includes the condition that the vacancy capacity of the parking lot is greater than zero, and then the remote server sends a reservation command to the parking lot computer in the parking lot corresponding to the selected parking lot information to finish the reservation operation.

As stated above, the parking lot reservation system eliminates personnel management expenses of the parking lots, enables vehicle drivers to book a nearby parking lot through the Internet when on the way to the destination, and therefore vehicle drivers can save a lot of time in getting to a parking lot.

The parking lot computer of the parking lot selected by the remote server sends a response of successful reservation to the remote server through the Internet after success of the reservation. The remote server controls the wireless communication module to send a message of successful reservation to the wireless communication device of the corresponding vehicle upon receipt of the response of successful reservation.

The parking lot computers each further have electrically connected thereto at least one gate controller, which is respectively installed in the at least one access of the associated parking lot and adapted to drive a respective gate to close/open the associated access.

The park reservation request further contains the identification code of the associated vehicle. The reservation command further comprises the identification code.

When the vehicle is going to enter the parking lot of which the parking lot information was selected by the remote server after success of reservation, the associated parking lot computer drives the respective electronic identification reader to read the identification code from the electronic identification device of the vehicle, and then compares the read-in identification code to the identification code contained in the received reservation command, and then controls the at least one gate controller to open the associated gate when the comparison is matched.

To provide an efficiency of the parking lot reservation system, the remote server has electrically connected thereto a remote navigation system and an electronic map. The remote navigation system is adapted to search the electronic map for a navigation route, which is the route to guide traveling of the corresponding vehicle from the current location of the corresponding vehicle to the parking lot of which the parking lot information was selected by the remote server. The remote server controls the wireless communication module to send the information of the navigation route to the wireless communication device of the corresponding vehicle.

Each vehicle carries thereon a navigation system and an electronic map. The navigation system is adapted to search the electronic map for a navigation route, which is the route to guide traveling of the corresponding vehicle from the current location of the corresponding vehicle to the parking lot of which the parking lot information was selected by the remote server. The navigation system is also adapted to search the electronic map so as to calculate an estimated arrival time. The parking lot information further comprises the information of the fee rate of the associated parking lot at the estimated arrival time.

The at least one electronic identification reader is adapted to read the identification code of the vehicle entering/leaving the associated parking lot and to send the read data to the associated parking lot computer for counting, and this counting will enable the associated parking lot computer to send the data to the remote server to update the vacancy capacity of the corresponding parking lot information in the parking lot database.

The park reservation request contains the at least one predetermined condition. The at least one predetermined condition can be defined or can be selected by the vehicle owner, and then send the defined or selected predetermined condition with the park reservation request to the remote server through the wireless communication device. The at least one predetermined condition can be built in the remote server. The at least one predetermined condition includes the condition of selecting the parking lot information of the parking lot to which the route from the current location of the corresponding vehicle is the shortest. The at least one predetermined condition further includes the condition of selecting the parking lot information of the parking lot of which the fee rate is the lowest.

The parking lot information of each parking lot further comprises the information of the fee rate of the corresponding parking lot.

Further, the electronic identification device can be one RFID (Radio Frequency Identification) device, a license plate with number thereon, a bar code, or an infrared rays transmitter, and etc. The at least one electronic identification reader of each parking lot can be correspondingly an RFID reader, an optical recognizer of license plate number, a bar code reader, or an infrared rays receiver, and etc.

Further, the global positioning device can be a GPS (Global positioning system) module.

Further, the wireless communication device of each vehicle can be a GPRS module, a GSM module, a 3G module, a blue tooth module, or any other equivalent wireless communication device. The wireless communication device of the remote server can be correspondingly a GPRS module, a GSM module, a 3G module, a blue tooth module, or any other equivalent wireless communication device.

DETAILED DESCRIPTION OF THE PREFERRED EMBODIMENT

Figure 1:
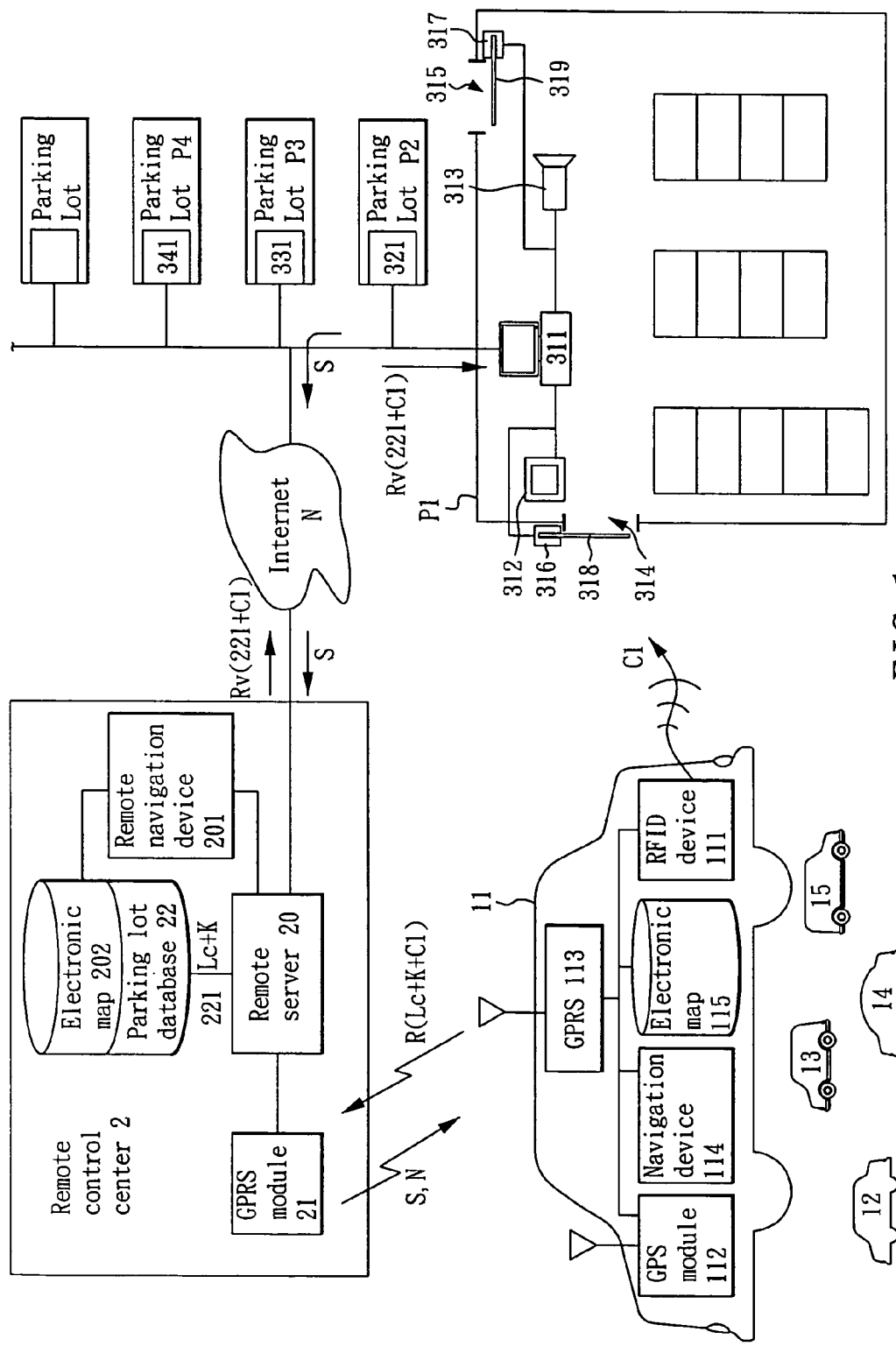
FIG. 1 illustrates the system architecture of a parking lot reservation system in accordance with the present invention.
Figure 2:
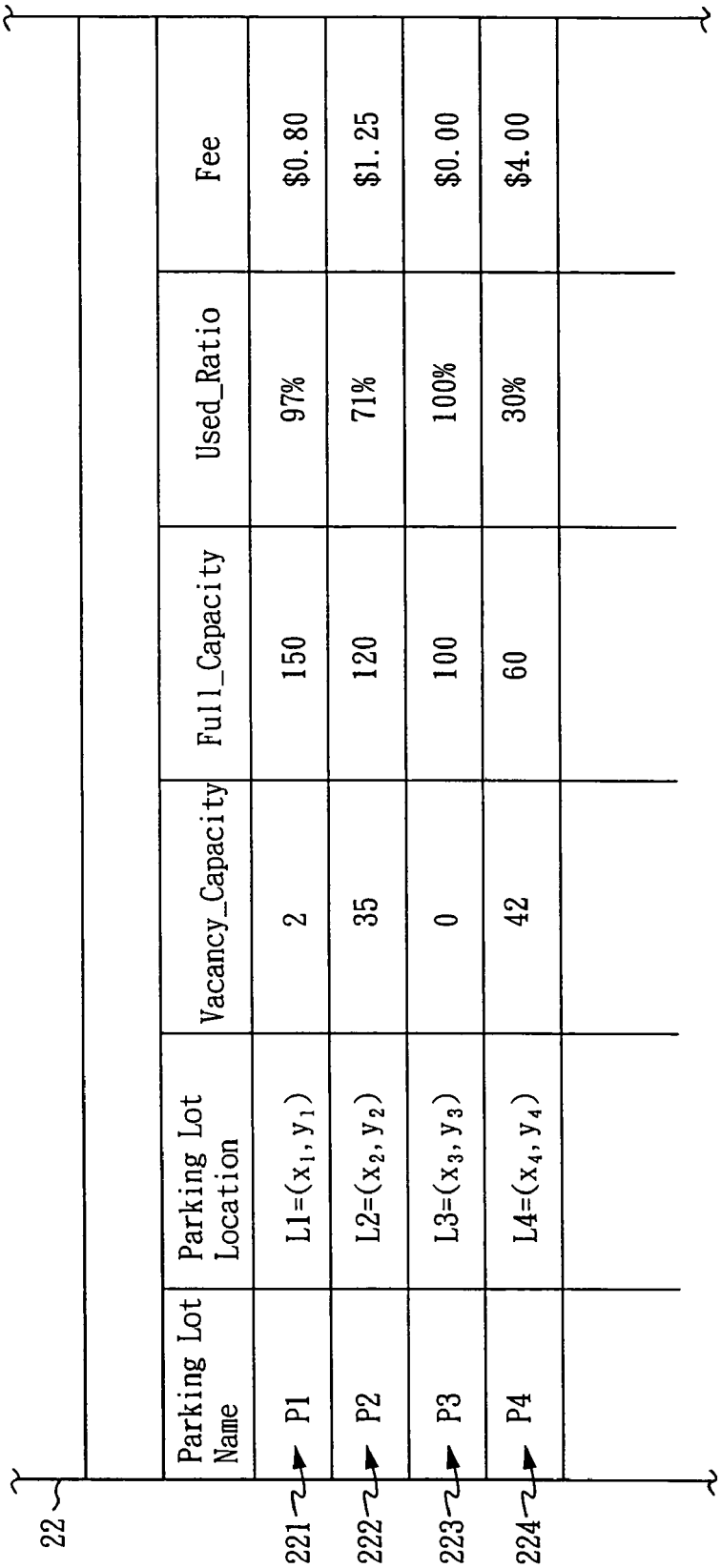
FIG. 2 is a schematic drawing of the parking lot database according to the present invention.

Referring to FIGS. 1 and 2, a parking lot reservation system in accordance with the present invention comprises a plurality of vehicles 11,12,13,14,15, a remote server 20, and a plurality of parking lot computers 311,321,331,341.

According to this embodiment, every vehicle 11 (FIG. 1 shows only one vehicle 11 for explanation) carries an electronic identification device 111, and the electronic identification device 111 is an RFID (Radio Frequency Identification) device. The electronic identification device 111 provides and sends a corresponding identification code C1 wirelessly.

Every vehicle 11 further comprises a global positioning device 112 and a wireless communication device 113. According to this embodiment, the global positioning device 112 is a GPS (Global Position System) module, and the wireless communication device 113 is a GPRS (General Packet Radio Service) module. The global positioning device 112 is adapted to calculate the current position Lc=(Xc,Yc) of the associated vehicle 11. By means of the wireless communication device 113, the vehicle 11 sends out a park reservation request R, which contains the information of the current position Lc of the associated vehicle 11 and the identification code C1 of the associated vehicle 11.

Further, the remote server 20 is installed in a remote control center 2, and electrically coupled to a wireless communication module 21 and a parking lot database 22. According to this embodiment, the wireless communication module 21 is a GPRS module. The parking lot database 22 has stored therein a plurality of parking lot information 221,222,223,224 . . . of respective parking lots P1, P2, P3, P4 . . . , geo data of parking lots P1, P2, P3, P4 . . . , vacancy capacity, full capacity, used rate, and fee rate, as shown in FIG. 2.

Further, a plurality of parking lot computers 311,321,331, 341 . . . are respectively installed in the parking lots P1, P2, P3, P4 . . . , and connected to the remote server 20 through the Internet N.

The remote server 20 receives the park reservation request R from each vehicle 11,12,13,14 through the wireless communication module 21, and then searches the parking lot database 22 subject to the information of the current location Lc of the vehicle 11 contained in the received park reservation request R, and then selects the parking lot information 221 that is in conformity with predetermined conditions K.

The aforesaid predetermined conditions K are explained hereinafter by way of an example. First, the remote server 20 selects from all parking lot information 221,222,223,224 the initially qualified parking lot information 221,222,224 of which the vacancy capacity is greater than zero, and then selects from the initially qualified parking lot information 221,222,224 the secondarily qualified parking lot information 221,224 to which the route from the current location Lc of the vehicle 11 is the shortest, and then selects from the secondarily qualified parking lot information 221,224 the finally qualified parking lot information 221 of which the fee rate is the cheapest.

Further, the vehicle owner can define or select the aforesaid predetermined conditions K, and then send the defined or selected predetermined conditions K with the park reservation request R to the remote server 20 through the wireless communication device 113. Alternatively, the predetermined conditions K can be built in the remote server 20. The remote server 20 sends a reservation command Rv through the Internet N to the parking lot computer 311 of the parking lot P1 corresponding to the selected parking lot information 221, thereby finishing the reservation operation. The reservation command Rv contains the corresponding identification code C1.

When the reservation operation has been successfully finished, the parking lot computer 311 of the parking lot P1 corresponding to the selected parking lot information 221 sends a response message S indicative of successful reservation to the remote server 20 through the Internet N. On the contrary, if the reservation operation fails, the remote server 20 drives the wireless communication module 21 to send a response message indicative of reservation failure to the vehicle owner, advising the vehicle owner to try to book other parking lots.

The parking lot computer 311 has electrically connected thereto two Electronic Identification Readers 312, 313 that are respectively installed in the two accesses 314,315 of the parking lot P1. According to this embodiment, the Electronic Identification Readers 312, 313 are RFID (Radio Frequency Identification) systems. The Electronic Identification Readers 312, 313 are adapted to read the identification code C1 of the vehicle 11 that enters or leaves from the corresponding parking lot P1, and sends the read data to the parking lot computer 311 for counting, after which parking lot computer 311 sends the information to the remote server 20 through the Internet N, for enabling the remote server 20 to update the vacancy capacity in the parking lot database 22.

Every parking lot computer 311 further has electrically connected thereto two gate controllers 316,317 that are respectively installed in the two accesses 314,315 of the corresponding parking lot P1. These two gate controllers 316, 317 are adapted to control a respective gate 318,319 to further close/open the accesses 314,315.

When the vehicle 11 is going to enter the parking lot P1 corresponding to the selected parking lot information 221, the corresponding parking lot computer 311 reads the identification code C1 from the electronic identification device 111 of the vehicle 11 through the Electronic Identification Reader 312 or 313, and then compares the fetched identification code C1 to the identification code C1 in the received reservation command Rv. When matched in the comparison, the parking lot computer 311 controls the gate controller 316 or 317 to open the gate 318 or 319, allowing the vehicle 11 to enter the parking lot P1.

As stated above, the parking lot reservation system eliminates personnel management expenses of the parking lots, enables vehicle drivers to book a nearby parking lot through the Internet when on the way to the destination, and therefore vehicle drivers can save a lot of time in getting to a parking lot.

Further, in order to enhance the efficiency of the parking lot reservation system, the remote server 20 can be set to provide different parking lots for reservation subject to different time periods so as to increase the used rate of different parking lots. Further, the remote server 20 has electrically connected thereto a remote navigation system 201 and an electronic map 202. The remote navigation system 201 is adapted to search the electronic map 202 so as to calculate the shortest navigation route N and the estimated arrival time. The navigation route N means the route from the current location Lc of the vehicle 11 to the location of the parking lot selected subject to the corresponding parking lot information. The remote server 20 controls the wireless communication module 21 to send the navigation route N to the wireless communication device 113 of the vehicle 11. At the same time, the remote server 20 searches from the parking lot database 22 the parking lot information subject to the predetermined conditions K, that parking lot information containing the fee rate of the corresponding parking lot at the estimated arrival time, and then the remote server 20 sends a reservation command Rv to the parking lot computer of the corresponding parking lot through the Internet N to finish the reservation.

For the same reason of enhancing the efficiency of the parking lot reservation system, the vehicle 11 can be equipped with a navigation system 114 and an electronic map 115. Because the navigation system 114 and the electronic map 115 work in a similar way, no further detailed description in this regard is necessary.

Although the present invention has been explained in relation to its preferred embodiments, it is to be understood that many other possible modifications and variations can be made without departing from the spirit and scope of the invention as hereinafter claimed.

What is claimed is:

1. A parking lot reservation system with electronic identification comprising:
    a plurality of vehicles, said vehicles each carrying an electronic identification device, each said electronic identification device providing a respective identification code, said vehicles each further including a global positioning device and a wireless communication device electrically connected to said global positioning device, said global positioning device being adapted to calculate the current location of the associated vehicle;
    a plurality of parking lots, said parking lots each having at least one access, said parking lots each providing respective parking lot information, said parking lot information including geo data and vacancy capacity of the associated parking lot;
    a remote server, said remote server having electrically connected thereto a wireless communication module and a parking lot database, said parking lot database having stored therein the parking lot information of each of said parking lots; and
    a plurality of parking lot computers respectively installed in said parking lots and connectable to said remote server through the Internet, said parking lot computers each having electrically connected thereto at least one electronic identification reader being respectively installed in the at least one access of the associated parking lot;
    wherein the wireless communication device of each of said vehicles is adapted to send out a park reservation request wirelessly, said park reservation request containing the information of the current location of the associated vehicle;
    wherein said remote server receives the park reservation request from each of said vehicles through said wireless communication module, and then searches said parking lot database subject to the information of the current location of the respective vehicle contained in the received park reservation request so as to select the parking lot information of one of said parking lots subject to at least one predetermined condition that includes the condition that the vacancy capacity of the parking lot is greater than zero, and then said remote server sends a reservation command to the parking lot computer in the parking lot corresponding to the selected parking lot information to finish the reservation operation,
    wherein the parking lot information of each of said parking lots further comprises the information of the fee rate of the corresponding parking lot; said at least one predetermined condition further includes the condition of selecting the parking lot information of the parking lot of which the fee rate is the lowest, and
    wherein said remote server further has electrically connected thereto a remote navigation system and an electronic map, said remote navigation system being adapted to search said electronic map so as to calculate an estimated arrival time; each said parking lot information further comprises the information of the fee rate of the associated parking lot at said estimated arrival time.

2. The parking lot reservation system with electronic identification as claimed in claim 1, wherein the parking lot computer of the parking lot of which the parking lot information is selected by said remote server sends a response of successful reservation to said remote server through the Internet after success of the reservation, and said remote server controls said wireless communication module to send a message of successful reservation to the wireless communication device of the corresponding vehicle upon receipt of said response of successful reservation.

3. The parking lot reservation system with electronic identification as claimed in claim 1, wherein said parking lot computers each further have electrically connected thereto at least one gate controller, said at least one gate controller being respectively installed in the at least one access of the associated parking lot and adapted to drive a respective gate to close/open the associated access;
    wherein said park reservation request further contains the identification code of the associated vehicle; said reservation command further comprising said identification code;
    wherein when the vehicle is going to enter the parking lot of which the parking lot information was selected by said remote server after success of reservation, the associated parking lot computer drives the respective electronic identification reader to read the identification code from the electronic identification device of the vehicle, and then compares the read-in identification code to the identification code contained in the received reservation command, and then controls said at least one gate controller to open the associated gate when the comparison has matched.

4. The parking lot reservation system with electronic identification as claimed in claim 1, wherein said remote server further has electrically connected thereto a remote navigation system and an electronic map, said remote navigation system being adapted to search said electronic map for a navigation route, said navigation route being the route to guide traveling of the corresponding vehicle from the current location of the corresponding vehicle to the parking lot of which the parking lot information was selected by said remote server; said remote server controls said wireless communication module to send the information of said navigation route to the wireless communication device of the corresponding vehicle.

5. The parking lot reservation system with electronic identification as claimed in claim 1, wherein said vehicles each further have carried thereon a navigation system and an electronic map, said navigation system being adapted to search said electronic map for a navigation route, said navigation route being the route to guide traveling of the corresponding vehicle from the current location of the corresponding vehicle to the parking lot of which the parking lot information was selected by said remote server.

6. The parking lot reservation system with electronic identification as claimed in claim 1, wherein said at least one electronic identification reader is adapted to read the identification code of the vehicle entering/leaving the associated parking lot and to send the read data to the associated parking lot computer for counting, for enabling the associated parking lot computer to send the data to said remote server to update the vacancy capacity of the corresponding parking lot information in said parking lot database.

7. The parking lot reservation system with electronic identification as claimed in claim 1, wherein said park reservation request further contains said at least one predetermined condition.

8. The parking lot reservation system with electronic identification as claimed in claim 1, wherein said at least one predetermined condition further includes the condition of selecting the parking lot information of the parking lot to which the route from the current location of the corresponding vehicle is the shortest.

9. A parking lot reservation system with electronic identification comprising:
a plurality of vehicles, said vehicles each carrying an electronic identification device, each said electronic identification device providing a respective identification code, said vehicles each further including a global positioning device and a wireless communication device electrically connected to said global positioning device, said global positioning device being adapted to calculate the current location of the associated vehicle;
a plurality of parking lots, said parking lots each having at least one access, said parking lots each providing respective parking lot information, said parking lot information including geo data and vacancy capacity of the associated parking lot;
a remote server, said remote server having electrically connected thereto a wireless communication module and a parking lot database, said parking lot database having stored therein the parking lot information of each of said parking lots; and
a plurality of parking lot computers respectively installed in said parking lots and connectable to said remote server through the Internet, said parking lot computers each having electrically connected thereto at least one electronic identification reader being respectively installed in the at least one access of the associated parking lot;
wherein the wireless communication device of each of said vehicles is adapted to send out a park reservation request wirelessly, said park reservation request containing the information of the current location of the associated vehicle;
wherein said remote server receives the park reservation request from each of said vehicles through said wireless communication module, and then searches said parking lot database subject to the information of the current location of the respective vehicle contained in the received park reservation request so as to select the parking lot information of one of said parking lots subject to at least one predetermined condition that includes the condition that the vacancy capacity of the parking lot is greater than zero, and then said remote server sends a reservation command to the parking lot computer in the parking lot corresponding to the selected parking lot information to finish the reservation operation,
wherein the parking lot information of each of said parking lots further comprises the information of the fee rate of the corresponding parking lot; said at least one predetermined condition further includes the condition of selecting the parking lot information of the parking lot of which the fee rate is the lowest, and
wherein said vehicles each further have thereon a navigation system and an electronic map, said navigation system being adapted to search said electronic map and to further calculate an estimated arrival time; each said parking lot information further comprises the information of the fee rate of the associated parking lot at said estimated arrival time.

10. The parking lot reservation system with electronic identification as claimed in claim 1, wherein said electronic identification device includes an RFID (Radio Frequency Identification) device; and, the at least one electronic identification reader of each said parking lots includes an RFID (Radio Frequency Identification) reader.

11. The parking lot reservation system with electronic identification as claimed in claim 1, wherein said global positioning device is a GPS module.

12. The parking lot reservation system with electronic identification as claimed in claim 1, wherein the wireless communication device of each said vehicle is a GPRS module; the wireless communication device of said remote server is a GPRS module.

13. The parking lot reservation system with electronic identification as claimed in claim 9, wherein the parking lot computer of the parking lot of which the parking lot information is selected by said remote server sends a response of successful reservation to said remote server through the Internet after success of the reservation, and said remote server controls said wireless communication module to send a message of successful reservation to the wireless communication device of the corresponding vehicle upon receipt of said response of successful reservation.

14. The parking lot reservation system with electronic identification as claimed in claim 9, wherein said parking lot computers each further have electrically connected thereto at least one gate controller, said at least one gate controller being respectively installed in the at least one access of the associated parking lot and adapted to drive a respective gate to close/open the associated access;

wherein said park reservation request further contains the identification code of the associated vehicle; said reservation command further comprising said identification code;

wherein when the vehicle is going to enter the parking lot of which the parking lot information was selected by said remote server after success of reservation, the associated parking lot computer drives the respective electronic identification reader to read the identification code from the electronic identification device of the vehicle, and then compares the read-in identification code to the identification code contained in the received reservation command, and then controls said at least one gate controller to open the associated gate when the comparison has matched.

15. The parking lot reservation system with electronic identification as claimed in claim 9, wherein said remote server further has electrically connected thereto a remote navigation system and an electronic map, said remote navigation system being adapted to search said electronic map for a navigation route, said navigation route being the route to guide traveling of the corresponding vehicle from the current location of the corresponding vehicle to the parking lot of which the parking lot information was selected by said remote server; said remote server controls said wireless communication module to send the information of said navigation route to the wireless communication device of the corresponding vehicle.

16. The parking lot reservation system with electronic identification as claimed in claim 9, wherein said vehicles each further have carried thereon a navigation system and an electronic map, said navigation system being adapted to search said electronic map for a navigation route, said navigation route being the route to guide traveling of the corresponding vehicle from the current location of the corresponding vehicle to the parking lot of which the parking lot information was selected by said remote server.

17. The parking lot reservation system with electronic identification as claimed in claim 9, wherein said at least one electronic identification reader is adapted to read the identification code of the vehicle entering/leaving the associated parking lot and to send the read data to the associated parking lot computer for counting, for enabling the associated parking lot computer to send the data to said remote server to update the vacancy capacity of the corresponding parking lot information in said parking lot database.

18. The parking lot reservation system with electronic identification as claimed in claim 9, wherein said park reservation request further contains said at least one predetermined condition.

19. The parking lot reservation system with electronic identification as claimed in claim 1, wherein said at least one predetermined condition further includes the condition of selecting the parking lot information of the parking lot to which the route from the current location of the corresponding vehicle is the shortest.

20. The parking lot reservation system with electronic identification as claimed in claim 9, wherein said electronic identification device includes an RFID (Radio Frequency Identification) device; and, the at least one electronic identification reader of each said parking lots includes an RFID (Radio Frequency Identification) reader.

21. The parking lot reservation system with electronic identification as claimed in claim 9, wherein said global positioning device is a GPS module.

22. The parking lot reservation system with electronic identification as claimed in claim 9, wherein the wireless communication device of each said vehicle is a GPRS module; the wireless communication device of said remote server is a GPRS module.

* * * * *